Dec. 19, 1933.  R. BURKLE  1,939,802
VALVE OPERATOR FOR AUTOMATIC DISH WASHING AND DRYING MACHINE
Filed March 16, 1933

INVENTOR
ROBERT BURKLE
BY
ATTORNEY

Patented Dec. 19, 1933

1,939,802

UNITED STATES PATENT OFFICE 1,939,802

VALVE OPERATOR FOR AUTOMATIC DISH WASHING AND DRYING MACHINE

Robert Burkle, North Bergen, N. J., assignor of one-half to Richard Merrifield, New York, N. Y.

Application March 16, 1933. Serial No. 661,077

9 Claims. (Cl. 137—144)

This invention relates to new and useful improvements in a valve operator for automatic dish washing and drying machines.

This application is a continuation in part of my application Serial No. 615,287 filed in United States Patent Office on June 4, 1932 and entitled Automatic dish washing and drying machine.

The invention has for an object the construction of a valve operator which is characterized by the ability of snapping the valves opened and closed as needed.

In the patent application mentioned above the operation of the dish washing and drying machine was given in full and from this application it will be readily seen that a valve operator is necessary for controlling the grease solvent and the hot water of the machine, and it is advisable that this valve operator be adapted to snap into the on or off position for immediate functioning.

Still further the invention contemplates an arrangement whereby automatic snails are provided to operate the valve operators.

Furthermore as another object of this invention it is proposed to construct the valve operator to include a rod movable in one or another direction past a dead center and a mechanism for snapping the valve as said rod is moved past its dead center of motion.

Still further the invention contemplates the provision of an expansion spring operatively connected between said movable rod and the rotative stem of said valve and arranged in manner so as to cause automatic turning of the valve stem as said rod is moved past its dead center.

Furthermore as another object of this invention it is proposed to provide an arrangement whereby the rod is moved past the dead center in one or the other directions depending upon the desired operation.

Still further the invention contemplates the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
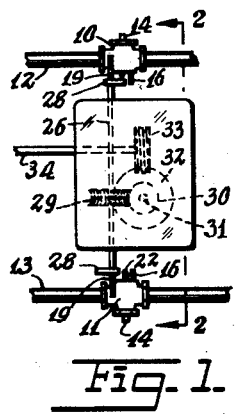
Fig. 1 is a plan view of a pair of valves and valve operators constructed according to this invention.

The invention is shown applied to valves 10 and 11 and connected with pipes 12 and 13 respectively adapted to control the passage of grease solvent, hot water or other fluid. The valves 10 and 11 are of the type which are substantially in the form of a shut-off cock to open or shut off by turning stem 14—90°. The valves 10 and 11 are provided with rotatable stems 14 adapted to rotate through 90 degrees to turn the valve from the on to the off positions and vice versa.

A means is provided on each of the valves for limiting rotation of the stem through substantially 90 degrees. This means comprises a lug 16 projecting from the stem 14 and abuttable against a pair of spaced lugs 17 arranged upon the valve body so as to limit rotation of the stem 14 to the desired angular amount. The lug 16 projects substantially parallel to the axis of the stem 14 and is radially spaced therefrom. Upon each of the valves a rod 18 is slidably arranged by reason of engaging through support brackets 19 and 20 attached respectively upon the top and the bottom of the valve body. The rod 18 is disposed on the opposite side of the axis of the stem 14 to that of the lug 16. Furthermore the rod 18 is disposed in a plane substantially parallel to or coinciding with the plane which contains the path of motion of the lug 16 between the lugs 17. Furthermore the rod 18 travels in a line which is at right angles to a line bisecting the angular motion of the lug 16.

A lug 21 is swivelly mounted on each of the rods 18 and is normally disposed on the opposite side of the bisecting line to the position of the lug 16. An expansion spring 22 is mounted over a guide rod 15 between the swiveled lug 21 and the lug 16 and normally serves to urge the rod 18 and the stem apart. The spring guide rod 15 is fastened to lug 16 and slidable through lug 21. A means is provided for limiting the travel of the rod 18 and comprises a pair of pins 23 and 24 mounted upon the rod 18 and located in positions so as to limit the travel in one direction by one of the pins 23 abutting the support 20 and limiting the travel in the other direction by the other pin 24 abutting the other bracket 19. This limiting means is so arranged that the swiveled lug 21 may be disposed upon one side or the other side of the line which bisects the angular motion of the lug 16.

Disposed between the valves 10 and 11, there is a casing 25 which supports an upper shaft 26 and a lower shaft 27. These shafts project from the sides of the casing and are provided with snail cams 28 located respectively above and below the rods 18 so as to move the rods during operation of the shafts. Each of the shafts 26 and 27 is provided with a worm gear 29 meshing with worm gears 30 fixed upon a vertical shaft 31 rotatively supported within the casing 25 and carrying another worm gear 32 meshing with a worm pinion 33 upon a driver shaft 34 which connects with some source of power, not shown on the drawing.

Figure 2:
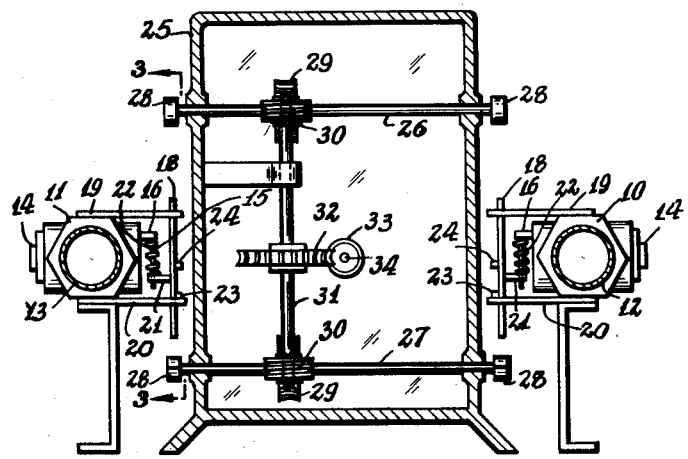
Fig. 2 is a transverse vertical sectional view taken on the line 2—2 of Fig. 1.
Figure 3:
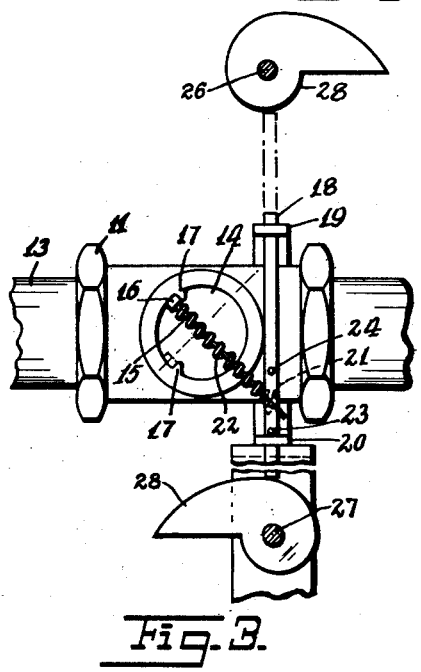
Fig. 3 is a sectional view taken on the line 3—3 of Fig. 2.

The operation of the valves 10 and 11 depends upon the operation of the snails 28. These snails may be so set as to cause the valves 10 and 11 to be opened and closed in certain specific sequences. As shown in Fig. 2 of the drawing each of the rods 18 are in their lowered positions. Rotations from the shaft 34 are transmitted to cause rotations of the shaft 27 and the snails 28 will act against the bottoms of the rods 18 so as to operate the valves, as desired. For example, assume that the snails are so set as to cause operation of the valve 11, then the snail cam engages the bottom end of the rod 18 of the valve 11 and raises this rod slightly past its dead center. Immediately the spring 22 will move the rod 18 into its completely raised position and simultaneously will rotate the stem 14 of the valve 11 so as to change the condition of the valve. If the valve was in the opened position it will now be closed and vise versa.

At another interval of time depending upon the setting of the snail cams the other snail cam 28 will operate the rod 18 of the valve 10. Similarly, thereafter according to the setting of the upper snail cams 28 the rods 18 of the valves will be moved downwards past the dead centers so as to cause the valves to again assume their original positions. In this manner, the operation continues. The valve operators are adapted to snap the valves from the closed to the opened positions and back, and so control the grease solvent, the hot water and other liquid supplies in the feed dish washing and drying machines.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Patent is:—

1. A valve operator, comprising a valve with a rotative stem, means for limiting the rotation of said stem through substantially 90 degrees from the opened to the closed position of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, an expansion spring between said lugs, means for limiting the travel of said rod to positions in which said swiveled lug is on one side or the other side of said bisecting line, snail cams above and below said rod to move the rod in one or the other direction past the dead center, and means for synchronizing the operation of said snail cams.

2. A valve operator, comprising a valve with a rotative stem, means for limiting the rotation of said stem through substantially 90 degrees from the opened to the closed position of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, an expansion spring between said lugs, means for limiting the travel of said rod to positions in which said swiveled lug is on one side or the other side of said bisecting line, snail cams above and below said rod to move the rod in one or the other direction past the dead center, and means for synchronizing the operation of said snail cams, said means for limiting rotation of the valve stem comprising said lug from the valve stem adapted to abutt against spaced lugs on the body of said valves.

3. A valve operator for an automatic dish washing and drying machine, comprising a valve with a rotative stem, means for limiting the rotation of said stem through substantially 90 degrees from the opened to the closed positions of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, an expansion spring between said lugs, means for limiting the travel of said rod to positions in which said swiveled lug is on one side or the other side of said bisecting line, snail cams above and below said rod to move the rod in one or the other direction past the dead center, and means for synchronizing the operation of said snail cams, brackets being attached upon the valve body and engaging said rod to slidably hold the rod as directed.

4. A valve operator for an automatic dish washing and drying machine, comprising a valve with a rotative stem, means for limiting the rotation of said stem through substantially 90 degrees from the opened to the closed position of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, an expansion spring between said lugs, means for limiting the travel of said rod to positions in which said swiveled lug is on one side or the other side of said bisecting line, snail cams above and below said rod to move the rod in one or the other direction past the dead center, and means for synchronizing the operation of said snail cams, said means for limiting the travel of said rod, comprising pins projecting from said rod and abutting against stationary members according to the travel of said rod.

5. A valve operator for an automatic dish washing and drying machine, comprising a valve with a rotative stem, means for limiting the rotation of said stem through substantially 90 degrees from the opened to the closed positions of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, an expansion spring between said lugs means for limiting the travel of said rod to positions in which said swiveled lug is on one side or the other side of said bisecting line, snail cams above and below said rod to move the rod in one or the other direction past the dead center, and means for synchronizing the operation of said snail cams, comprising shafts supporting said snail cams, mechanism connecting the shafts for unitary and related motion, and means for causing the operation of said mechanism.

6. In a device of the class described, a pair of spaced valves for controlling a supply of grease solvent, hot water and the like, a casing located between these valves, shafts projecting from said casings and carrying snail cams, and snap mechanisms arranged upon said valve and operated by said snails to cause the operation of the valves as desired, said snap mechanisms including a movable rod adapted to be moved in one or the other direction, said snail cams being at each end of the rod and engageable against the rod for moving the rod in one or the other direction so as to control the operation of the snap mechanism.

7. A valve operator for an automatic dish washing and drying machine, comprising a valve with a rotative stem, means for limiting the rotation of said stem through substantially 90 degrees from the opened to the closed position of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, a guide rod between the lugs, means for limiting the travel of said rod to positions in which said swiveled lug is on one side or the other side of said bisecting line, snail cams above and below said rod to move the rod in one or the other direction past dead center, and means for synchronizing the operation of said snail cams.

8. A valve operator for an automatic dish washing and drying machine, comprising a valve with a rotative stem, means for limiting the rotation of said stem through substantially 90 degrees from the opened to the closed position of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, a guide rod between the lugs, an expansion spring engaged on the guide rod and between the lugs, means for limiting the travel of said rod to positions in which said swiveled lug is on one side or the other side of said bisecting line, snail cams above and below said rod to move the rod in one or the other direction past dead center, and means for synchronizing the operation of said snail cams, said guide rod being rigidly attached upon the lug projecting from the stem and slidably engaged through an aperture formed in the swiveled lug.

9. A valve operator for an automatic dish washing and drying machine, comprising a valve with a rotative stem, means for limiting the rotation of said stem through substantially 90 degrees from the opened to the closed position of the valve, a lug projecting from the stem substantially parallel to the axis of the stem and radially spaced therefrom, a rod slidably supported on the valve body on the opposite side of the stem axis from said lug and in a plane substantially parallel to the plane containing the path of motion of said lug and at substantially right angles to a line bisecting the angular motion of said lug, another lug swiveled on said rod and normally on the opposite side of the axis of said stem to that of said lug, means for urging the lugs apart, means for limiting the travel of said rod to positions in which said swiveled lug is on one side or the other side of said bisecting line, snail cams above and below said rod to move the rod in one or the other direction past the dead center, and means for synchronizing the operation of said snail cams.

ROBERT BURKLE.